United States Patent
Takai

(10) Patent No.: US 10,599,010 B2
(45) Date of Patent: Mar. 24, 2020

(54) ILLUMINATION DEVICE, DISPLAY APPARATUS, AND CONTROL METHOD

(71) Applicant: CANON KABUSHIKI KAISHA, Tokyo (JP)

(72) Inventor: Junji Takai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 15/646,970

(22) Filed: Jul. 11, 2017

(65) Prior Publication Data

US 2018/0017846 A1 Jan. 18, 2018

(30) Foreign Application Priority Data

Jul. 15, 2016 (JP) .................................. 2016-140646

(51) Int. Cl.
  *G03B 15/05* (2006.01)
  *G03B 17/18* (2006.01)

(52) U.S. Cl.
  CPC ............. *G03B 15/05* (2013.01); *G03B 17/18* (2013.01); *G03B 2215/0521* (2013.01)

(58) Field of Classification Search
  CPC .......................... G03B 15/02–03; G03B 15/05
  See application file for complete search history.

(56) References Cited

U.S. PATENT DOCUMENTS

| 7,576,401 | B1 | 8/2009 | De Guzman et al. |
| 2006/0126194 | A1 | 6/2006 | Kazama |
| 2009/0196595 | A1* | 8/2009 | Okubo ............... G03B 15/05 |
| | | | 396/175 |
| 2015/0062861 | A1 | 3/2015 | Yamashita |

FOREIGN PATENT DOCUMENTS

| CN | 1760717 A | 4/2006 |
| CN | 1823286 A | 8/2006 |
| CN | 101945611 A | 1/2011 |
| CN | 102833446 A | 12/2012 |
| JP | 2009222740 A | 10/2009 |
| JP | 2011170014 A | 9/2011 |

* cited by examiner

*Primary Examiner* — Minh Q Phan
(74) *Attorney, Agent, or Firm* — Canon U.S.A., Inc. IP Division

(57) ABSTRACT

An illumination device includes a first housing, a second housing having a light source, capable of rotating with respect to the first housing, a driving unit configured to rotate the second housing about a first axis in a first direction and/or a second axis orthogonal to the first axis in a second direction, with respect to the first housing, and a display control unit configured to display, on a display unit, information indicating an irradiation direction of light from the light source, wherein the display control unit changes information about the first direction included in the information indicating the irradiation direction displayed on the display unit, according to a rotation angle of the second housing in the second direction.

11 Claims, 9 Drawing Sheets

ILLUMINATION DEVICE, DISPLAY APPARATUS, AND CONTROL METHOD

BACKGROUND OF THE INVENTION

Field of the Invention

The present invention relates to display control of information indicating an irradiation direction of an illumination device.

Description of the Related Art

Conventionally, there has been known flash image capturing in which an object is irradiated with light that is emitted from an illumination device to a ceiling or the like and reflected on the ceiling or the like and diffused (hereinafter, referred to as "bounce flash image capturing"). With the bounce flash image capturing, the object can be not directly but indirectly irradiated with light from the illumination device, so that an image can be rendered with soft light.

Further, there is provided a technique relating to an illumination device capable of automatically changing an irradiation direction of the illumination device (hereinafter, referred to as "auto-bounce").

In a technique discussed in Japanese Patent Application Laid-Open No. 2011-170014, a bounce irradiation angle is calculated based on information about a distance to an object and information about a distance to a reflection body, and a light emitting unit is driven based on the calculated irradiation angle.

However, in the technique described in Japanese Patent Application Laid-Open No. 2011-170014 fails to consider a method of notifying a user of information indicating the irradiation direction of the light emitting unit. Thus, with the technique described in Japanese Patent Application Laid-Open No. 2011-170014, the user cannot easily check the irradiation direction of the light emitting unit.

In a case of a flash device having a configuration in which a light emitting unit is rotatable about a vertical axis and a horizontal axis with respect to a flash device main unit as with the flash device discussed in Japanese Patent Application Laid-Open No. 2011-170014, even if a relative position of the light emitting unit with respect to the flash device main unit is not changed, a combination of a vertical axis rotation angle and a horizontal axis rotation angle can be different. In such a case, it is desirable that the information indicating the irradiation direction of the light emitting unit be notified to the user in a recognizable way.

SUMMARY OF THE INVENTION

According to an aspect of the present invention, an illumination device includes a first housing, a second housing having a light source, capable of rotating with respect to the first housing, a driving unit configured to rotate the second housing about a first axis in a first direction and/or a second axis orthogonal to the first axis in a second direction, with respect to the first housing, and a display control unit configured to display, on a display unit, information indicating an irradiation direction of light from the light source, wherein the display control unit changes information about the first direction included in the information indicating the irradiation direction displayed on the display unit, according to a rotation angle of the second housing in the second direction.

Further features of the present invention will become apparent from the following description of exemplary embodiments with reference to the attached drawings.

DESCRIPTION OF THE EMBODIMENTS

Hereinafter, exemplary embodiments of the present invention will be described in detail with reference to the appended drawings.

Figure 1:
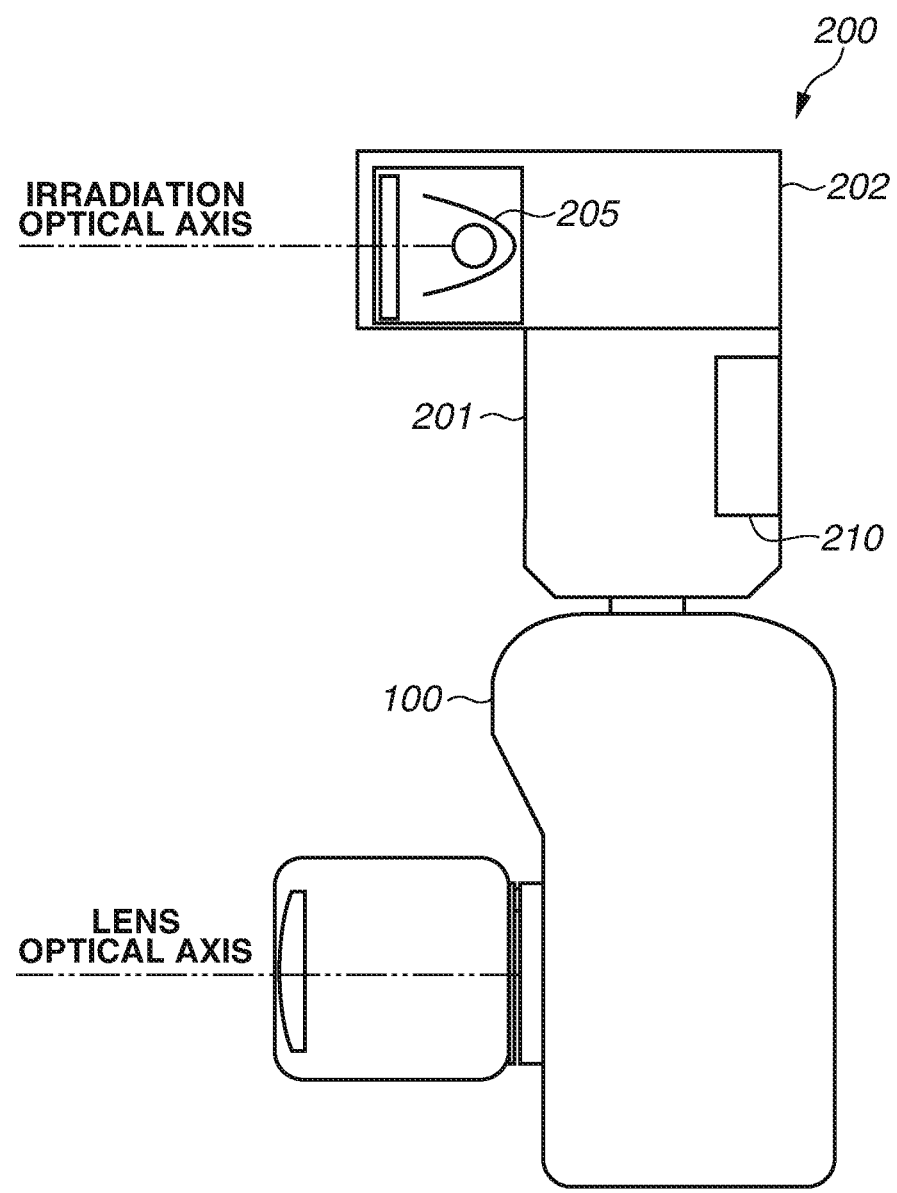
FIG. 1 is a schematic diagram illustrating an image capturing system according to a first exemplary embodiment.

FIG. 1 is a schematic diagram illustrating an image capturing system according to a first exemplary embodiment. The image capturing system according to the present exemplary embodiment includes a camera 100 as an image capturing apparatus and an external flash device 200 as an illumination device. The external flash device 200 includes a flash device main unit 201 (first housing) attached to the camera 100 and a flash device head unit 202 (second housing) capable of rotating about a first axis and a second axis orthogonal to the first axis with respect to the flash device main unit 201. A display unit 210 is provided on the flash device main unit 201, and information indicating the irradiation direction of the external flash device 200 can be displayed an the display unit 210. A light emitting unit 205 is provided on the flash device head unit 202, and the irradiation direction of the external flash device 200 can be changed by making the flash device head unit 202 rotate about a first axis or a second axis with respect to the flash device main unit 201.

Further, in the present exemplary embodiment, a position of the flash device head unit 202 with respect to the flash device main unit 201 attached to the camera 100, at which a lens optical axis of the camera 100 and an irradiation optical axis of the light emitting unit 205 become substantially parallel to each other, is assumed as a reference position. Then, a first axis rotation angle and a second axis rotation angle of the flash device head unit 202 positioned at the reference position are assumed as 0-degree respectively. Further, one face of the external flash device 200 on a side of the flash device main unit 201 is assumed as a lower side, one face thereof on a side of the flash device head unit 202 is assumed as an upper side, and one face thereof on a side of the display unit 210 of the flash device main unit 201 is assumed as a rear side. Furthermore, faces on the right and the left sides when the flash device main unit 201 is viewed from the rear side are respectively assumed as a left side and a right side of the external flash device 200. Further, an axis parallel to the horizontal direction of the flash device main unit 201 is assumed as a first axis, an axis parallel to the vertical direction of the flash device main unit 201 is assumed as a second axis, rotation in the vertical direction is assumed as first axis rotation (i.e., rotation that makes the first axis as a center), and rotation in the horizontal direction is assumed as second axis rotation (i.e., rotation that makes the second axis as a center). Further, in the present exemplary embodiment, the flash device head unit 202 is coupled to the flash device main unit 201 so as to be rotatable by 140-degree in the upper direction and 180-degree in each of the right and the left directions with respect to the flash device main unit 201.

Figure 2:
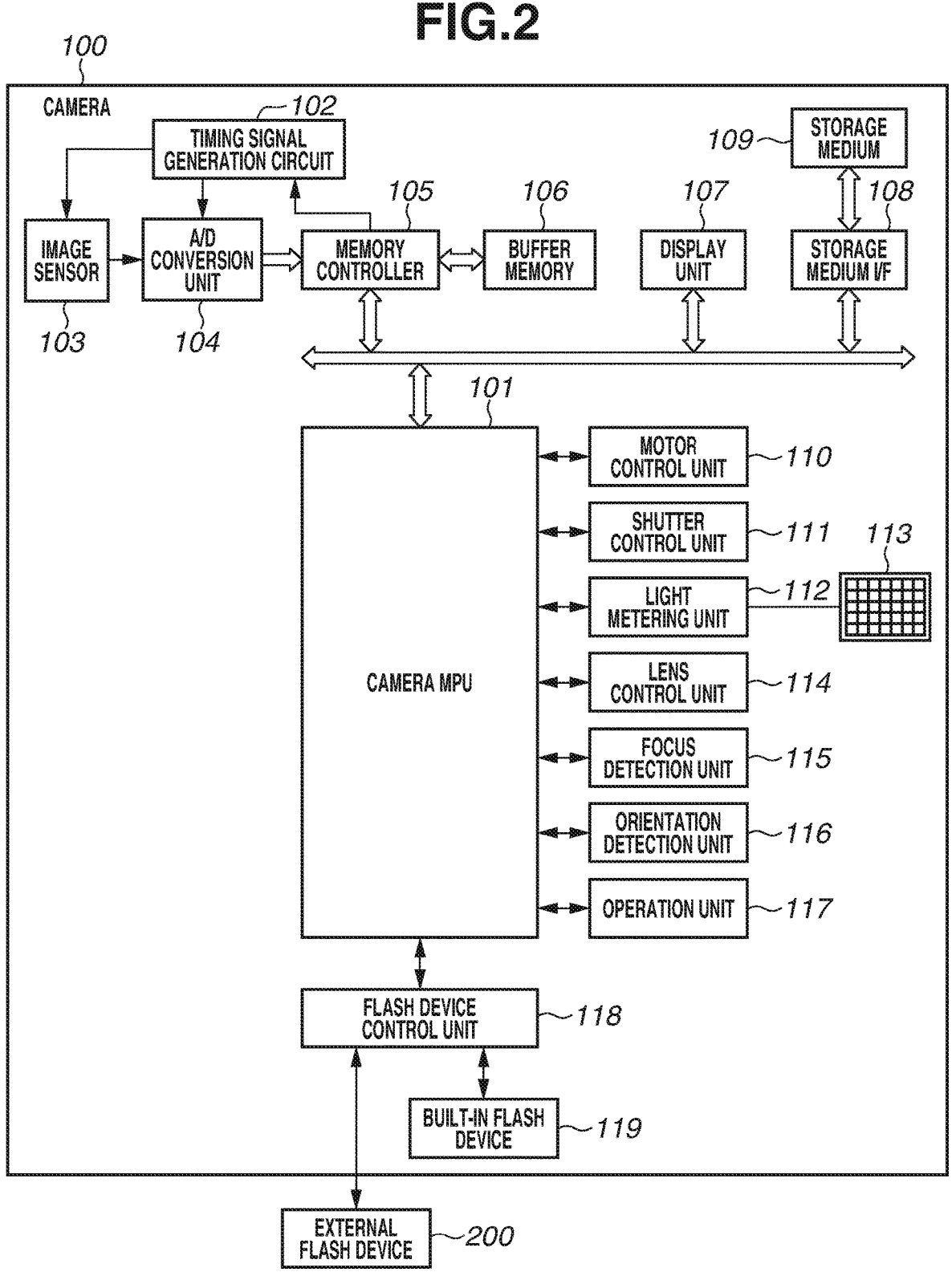
FIG. 2 is a block diagram illustrating a configuration of a camera according to the first exemplary embodiment.
Figure 3:
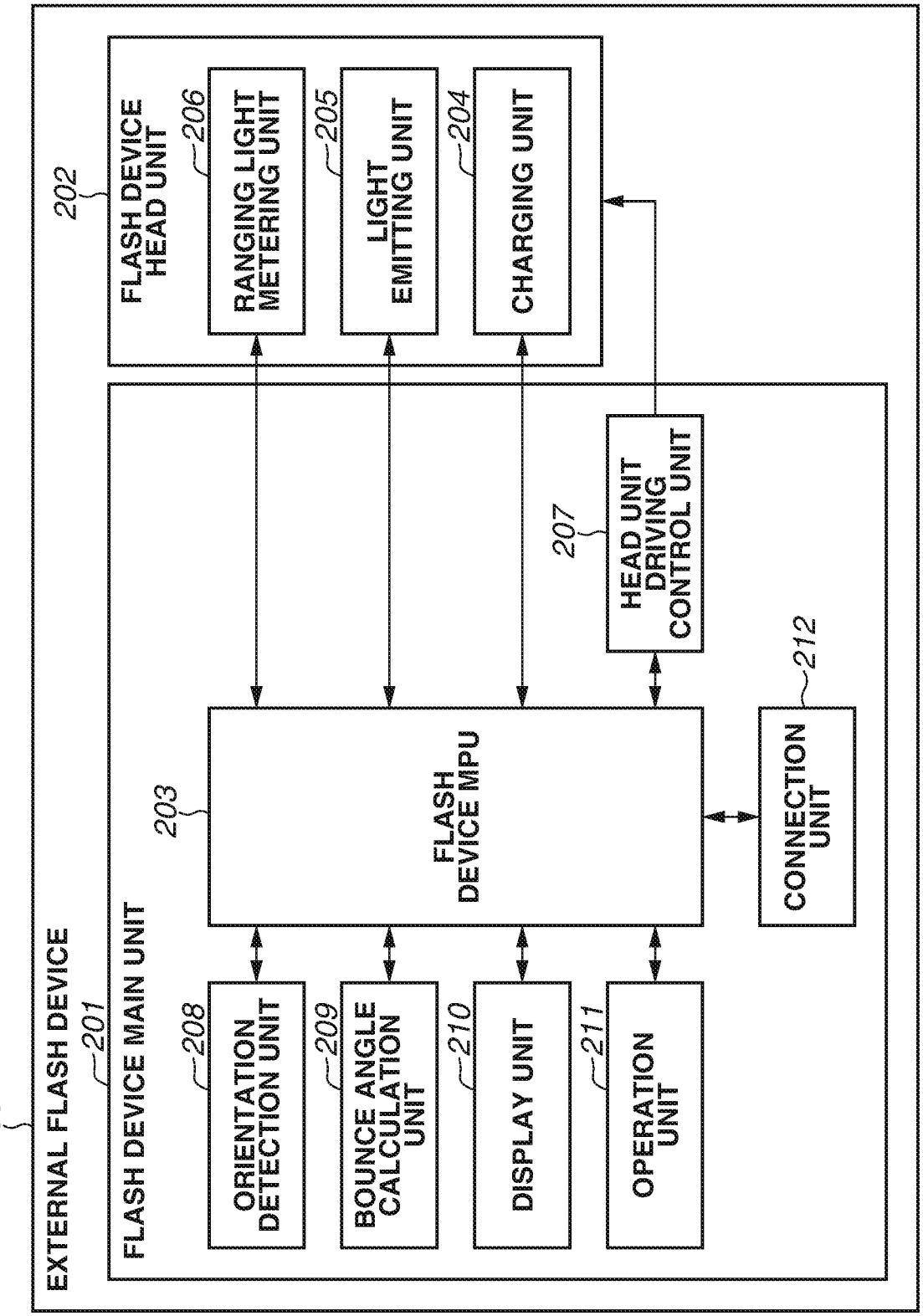
FIG. 3 is a block diagram illustrating a configuration of an external flash device according to the first exemplary embodiment.

Next, an image capturing system of the present exemplary embodiment will be described in detail with reference to FIGS. 2 and 3. FIG. 2 is a block diagram illustrating a configuration of the camera 100, and FIG. 3 is a block diagram illustrating a configuration of the external flash device 200.

First, a configuration of the camera 100 will be described. A camera micro-processing unit (MPU) 101 is a microcontroller of the camera 100 which controls the entire operation of the image capturing system such as image capturing sequence. For example, the camera MPU 101 is a single-chip microcomputer which includes an arithmetic logical unit (ALU), a read only memory (ROM), a random access memory (RAM), an analog/digital (A/D) conversion unit, a timer, and a serial communication port (serial peripheral interface (SPI)).

An image sensor 103 is a charge coupled device (CCD) image sensor or a complementary metal oxide semiconductor (CMOS) image sensor which converts light received from an object into an electric signal, and a timing signal generation circuit 102 generates a timing signal necessary to operate the image sensor 103. An A/D conversion unit 104 converts analog image data read from the image sensor 103 into digital image data, and a memory controller 105 controls a reading/writing operation of a memory or a refresh operation of a buffer memory 106. A display unit 107 displays image data stored in the buffer memory 106, a storage medium interface (I/F) 108 is an interface for connecting to a storage medium, and a storage medium 109 is a storage medium such as a memory card or a hard disk.

A motor control unit 110 controls a motor (not illustrated) to move a mirror (not illustrated) up and down or charges a shutter (not illustrated) according to a signal transmitted from the camera MPU 101 when an exposure operation is performed. According to a signal transmitted from the camera MPU 101, a shutter control unit 111 makes a front curtain and a rear curtain of the shutter move reciprocally and controls the exposure operation.

A light metering unit 112 outputs an output from a light metering sensor 113 having a plurality of light metering areas to the camera MPU 101 as a luminance signal of a plurality of areas in an image capturing region. The camera MPU 101 converts the luminance signal through an A/D conversion unit (not illustrated) and executes calculation (photometric operation) of an aperture value (AV), a shutter speed (time value (TV)), and an ISO sensitivity for executing exposure adjustment. Similarly, the light metering unit 112 also outputs a luminance signal of preliminary light emission which the built-in flash device 119 or the external flash device 200 performs with respect to the object to the camera MPU 101 and calculates the flash light amount for main light emission.

A lens control unit 114 communicates with the camera MPU 101 to operate a lens driving motor and a lens aperture motor (not illustrated), so as to execute focus adjustment and aperture control of the lens. A focus detection unit 115 has a function of detecting a defocusing amount with respect to the object in order to execute auto-focusing (AF).

An orientation detection unit 116 detects an inclination of the camera 100 with respect to a gravitational rotation direction and a lens optical axis rotation direction by using an inertial sensor such as a gyro sensor or an acceleration sensor. An operation unit 117 transmits a signal indicating that the user operates the operation unit 117 to the camera MPU 101. The operation unit 117 detects the operation and transmits a signal to the camera MPU 101, so that auto-focusing (AF) or light metering is started when the camera MPU 101 receives a signal indicating a half-pressed state of a release button of the operation unit 117, and image capturing is started when the camera MPU 101 receives a signal indicating a fully-pressed state of the release button.

A flash device control unit 118 executes light emitting control of a built-in flash device 119 and the external flash device 200. Further, the flash device control unit 118 executes switching control of whether to use the built-in flash device 119 or the external flash device 200. Further, the camera MPU 101 communicates with the external flash device 200 via the flash device control unit 118.

Next, a configuration of the external flash device 200 will be described.

A flash device MPU 203 is a microcontroller which controls the entire operation of the external flash device 200 such as charging sequence, light emitting control sequence, or determination of a rotation angle of the flash device head unit 202. The flash device MPU 203 is a single-chip microcomputer which includes an ALU, a ROM, a RAM, an A/D conversion unit, a timer, and a serial communication port (SPI).

A charging unit 204 includes a booster circuit and a main capacitor charged by the booster circuit, and outputs a charging voltage to the flash device MPU 203. The flash device MPU 203 converts the charging voltage through an A/D conversion unit (not illustrated) and determines whether a charging voltage level is sufficient for emitting light. The Id t emitting unit 205 includes a light source such as a xenon tube or a light emitting diode (LED), and emits flash light according to a light emitting signal transmitted from the flash device MPU 203.

A ranging light metering unit 206 has a ranging light metering sensor, so as to receive reflection light through the ranging light sensor when a ranging target is irradiated with flash light emitted from the light emitting unit 205 and output a luminance signal to the flash device MPU 203 as a light receiving result. The flash device MPU 203 executes conversion of the luminance signal through an A/D conversion unit (not illustrated) and calculates a ranging target distance based on the conversion amount.

According to a signal from the flash device MPU 203, a head unit driving control unit 207 controls a motor to rotate the flash device head unit 202 in the vertical direction or the horizontal direction with respect to the flash device main unit 201. In addition, the flash device head unit 202 can be rotated in the vertical direction or the horizontal direction through a manual operation of the user instead of being rotated by a driving force of the motor. Further, the head unit driving control unit 207 detects driving amounts of the flash device head unit 202 in the vertical direction and the horizontal direction through an encoder, and outputs the driving amounts to the flash device MPU 203. In the present exemplary embodiment, the rotation angle from the above-described reference position (0-degree in the vertical and the horizontal directions) is taken as the driving amount.

An orientation detection unit 208 detects an inclination of the external flash device 200 with respect to a gravitational rotation direction and a front/rear rotation direction by using an inertial sensor such as a gyro sensor or an acceleration sensor.

A bounce angle calculation unit 209 calculates an irradiation direction of the external flash device 200 preferable for bounce flash image capturing based on the ranging target distance calculated by the flash device MPU 203 and the orientation information indicating the inclination of the external flash device 200 detected by the orientation detection unit 208. In the present exemplary embodiment, as the irradiation direction of the external flash device 200 preferable for the bounce flash image capturing, a rotation angle of the flash device head unit 202 preferable for the bounce flash image capturing is calculated.

A display unit 210 displays a rotation angle of the flash device head unit 202 detected by the head unit driving control unit 207 as the information indicating the irradiation direction of the external flash device 200. An operation unit 211 transmits a signal indicating that the user operates the operation unit 211 to the flash device MPU 203. The flash device MPU 203 receives a signal indicating a press of an auto-bounce start switch of the operation unit 211 to make the flash device head unit 202 automatically rotate by a predetermined rotation angle. A connection unit 212 for connecting the external flash device 200 to the camera 100 includes a shoe member for attaching the external flash device 200 to an accessory shoe of the camera 100 and a signal terminal for executing communication with the camera 100, so that the external flash device 200 communicates with the camera 100 via the connection unit 212.

In the present exemplary embodiment, the flash device main unit 201 includes the flash device MPU 203, the head unit driving control unit 207, the orientation detection unit 208, the bounce angle calculation unit 209, the display unit 210, the operation unit 211, and the connection unit 212. Further, the flash device head unit 202 includes the charging unit 204, the light emitting unit 205, and the ranging light metering unit 206. However, the exemplary embodiment is not limited to the above, and the flash device main unit 201 and the flash device head unit 202 may be configured of any constituent elements of the external flash device 200. Any configurations are possible as long as the flash device main unit 201 at least includes the connection unit 212, whereas the flash device head unit 202 at least includes the light emitting unit 205.

Figure 4:
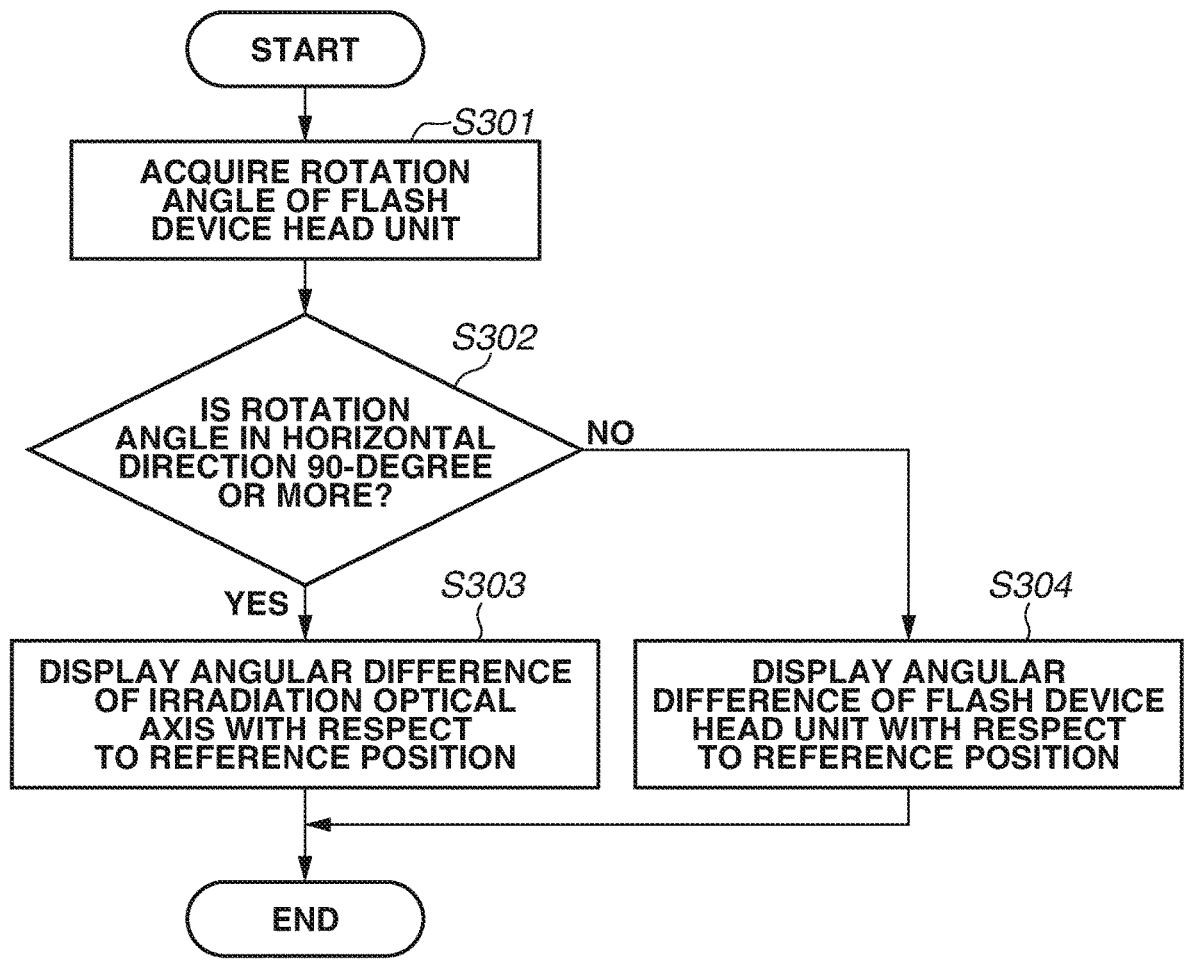
FIG. 4 is a flowchart illustrating display control of information indicating an irradiation direction of the external flash device according to the first exemplary embodiment.

Next, display control of information indicating the irradiation direction of the external flash device 200 in the present exemplary embodiment will be described with reference to FIG. 4 and FIGS. 5A to 5E. FIG. 4 is a flowchart illustrating display control of the information indicating the irradiation direction of the external flash device 200 in the present exemplary embodiment, and FIGS. 5A to 5E are diagrams illustrating display examples of the information indicating the irradiation direction of the external flash device 200.

The flowchart in FIG. 4 is started when a specific button or a switch of the operation unit 211 is operated or when the external flash device 200 receives a display request of information indicating the irradiation direction of the external flash device 200 from the camera 100. In addition, the flowchart in FIG. 4 may be started periodically.

In step S301, the flash device MPU 203 acquires rotation angles of the flash device head unit 202 in the vertical direction and the horizontal direction detected by the head unit driving control unit 207. The rotation angles acquired in the above may be the latest information at a time point when the processing proceeds to step S301, or may be information detected after the processing proceeds to step S301.

In step S302, the flash device MPU 203 determines whether the rotation angle in the horizontal direction acquired in step S301 is 90-degree or more. If the rotation angle is 90-degree or more (YES in step S302), the processing proceeds to step S303, and if the rotation angle is less than 90-degree (NO in step S302), the processing proceeds to step S304.

In step S303, as the information indicating the irradiation direction of the external flash device 200, the flash device MPU 203 makes the display unit 210 display an angular difference of the current irradiation optical axis of the light emitting unit 205 with respect to the irradiation optical axis of the light emitting unit 205 when the flash device head unit 202 is positioned at the reference position.

On the other hand, in step S304, as the information indicating the irradiation direction of the external flash device 200, the flash device MPU 203 makes the display unit 210 display an angular difference between the current position and the reference position of the flash device head unit 202.

FIGS. 5A to 5E are diagrams illustrating display examples of the information indicating the irradiation direction of the external flash device 200 according to a state of the flash device head unit 202. In FIGS. 5A to 5E, information about the vertical direction is displayed on the left side of the display unit 210, and the information about the horizontal direction is displayed on the right side of the display unit 210. More specifically, a numerical value representing an angular difference and an arrow indicating the upper or the lower direction are displayed on the left side of the display unit 210. Similarly, a numerical value representing an angular difference and an arrow indicating the right or the left direction are displayed on the right side of the display unit 210. Further, FIGS. 5A to 5E illustrate display examples in which the angular difference between the current position and the reference position of the flash device head unit 202 is displayed on the display unit 210.

Figure 5A:
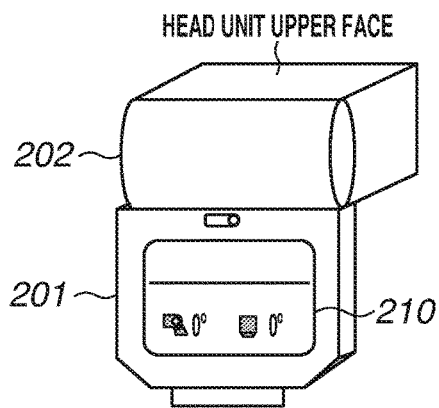
FIGS. 5A, 5B, 5C, 5D, 5E, 5F, 5G, and 5H are diagrams illustrating display examples of information indicating the irradiation direction of the external flash device according to the first exemplary embodiment.

FIG. 5A illustrates a state where the flash device head unit 202 is positioned at the reference position. In this state, both of the angular differences in the vertical direction and the horizontal direction are 0-degree, and thus the information displayed on the display unit 210 indicates that the angular differences are 0-degree in both of the vertical direction and the horizontal direction.

Figure 5B:
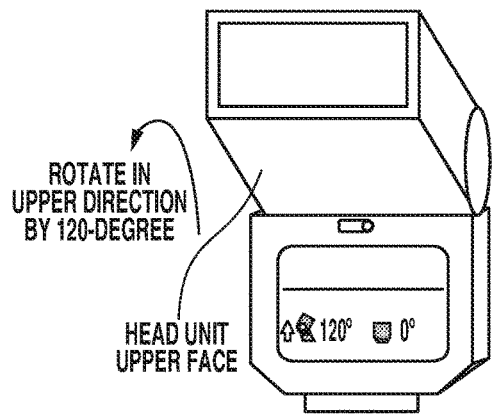

FIG. 5B illustrates a state where the flash device head unit 202 is rotated in the upper direction by 120-degree from the reference position. Thus, the information displayed on the display unit 210 indicates that the angular differences are 120-degree and 0-degree in the upper direction and the horizontal direction, respectively.

Figure 5C:
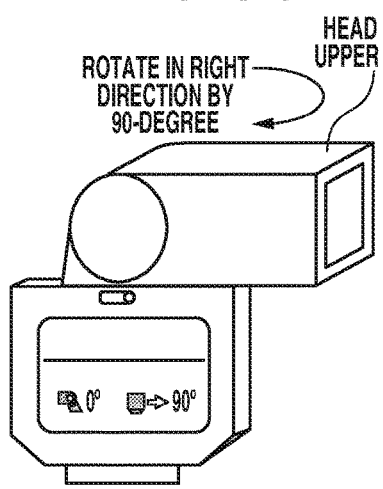

FIG. 5C illustrates a state where the flash device head unit 202 is rotated in the right direction by 90-degree from the reference position. The angular differences are 0-degree and 90-degree in the vertical direction and the right direction. Accordingly, the information displayed on the display unit 210 indicates that the angular differences are 0-degree and 90-degree in the vertical direction and the right direction, respectively.

Figure 5D:
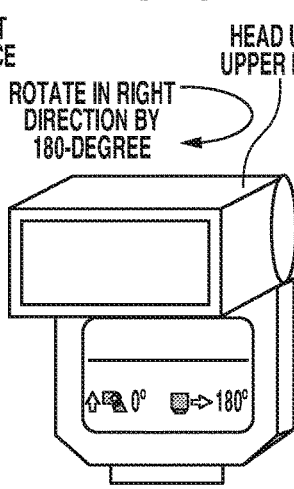

FIG. 5D illustrates a state where the flash device head unit 202 is rotated in the right direction by 180-degree from the reference position. Thus, the information displayed on the display unit 210 indicates that the angular differences are 0-degree and 180-degree in the vertical direction and the right direction, respectively.

Figure 5E:
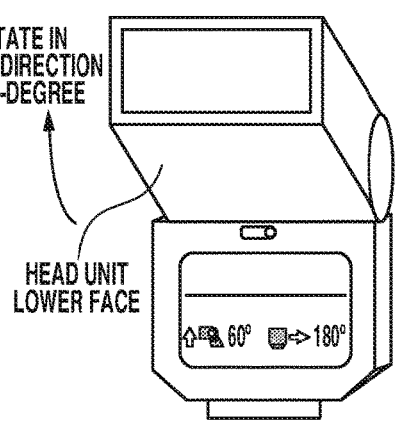

FIG. 5E illustrates a state where the flash device head unit 202 is rotated in the upper direction and the right direction by 60-degree and 180-degree, respectively, from the reference position. Thus, the information displayed on the display unit 210 indicates that the angular differences are 60-degree and 180-degree in the upper direction and the right direction, respectively.

As described above, when the angular differences of the flash device head unit 202 with respect to the reference position are displayed on the display unit 210, even if the irradiation optical axis of the light emitting unit 205 is oriented in a same direction, different values are displayed as the angular difference in the vertical direction and the angular difference in the horizontal direction as with the states illustrated in FIGS. 5B and 5E.

Figure 5F:
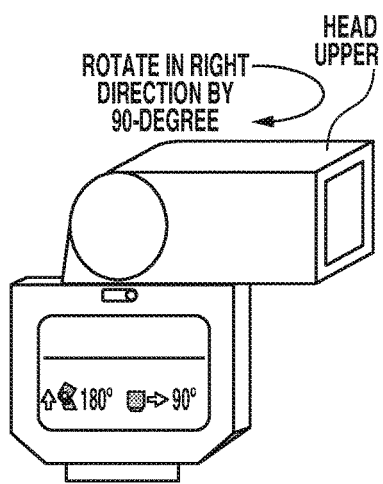
Figure 5G:
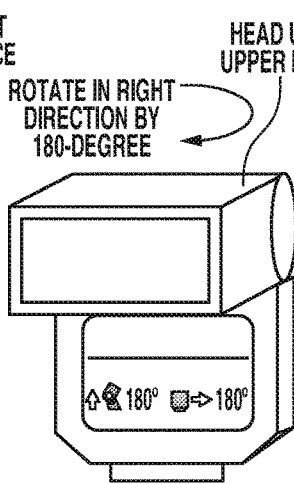
Figure 5H:
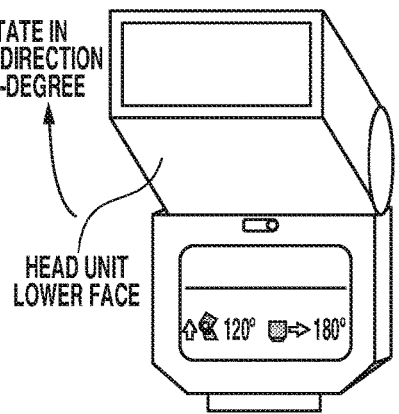

As such, in the present exemplary embodiment, as illustrated in FIGS. 5F to 5H, in a case where the rotation angle of the flash device head unit 202 in the horizontal direction is 90-degree or more, the angular difference of the current irradiation optical axis of the light emitting unit 205 with respect to the irradiation optical axis of the light emitting unit 205 when the flash device head unit 202 is positioned at the reference position is displayed on the display unit 210.

Similar to the state illustrated in FIG. 5C, FIG. 5F illustrates a state where the flash device head unit 202 is rotated by 90-degree in the right direction from the reference position. However, the information displayed on the display unit 210 indicates that the angular differences are 180-degree and 90-degree in the upper direction and the right direction, respectively.

Similar to the state illustrated in FIG. 5D, FIG. 5G illustrates a state where the flash device head unit 202 is rotated by 180-degree in the right direction from the reference position. However, the information displayed on the display unit 210 indicates that the angular differences are 180-degree in both of the upper direction and the right direction.

Similar to the state illustrated in FIG. 5E, FIG. 5H illustrates a state where the flash device head unit 202 is rotated by 60-degree and 180-degree in the upper direction and the right direction from the reference position, respectively. However, the information displayed on the display unit 210 indicates that the angular differences are 120-degree and 180-degree in the upper direction and the right direction, respectively.

As described above, in the present exemplary embodiment, when the rotation angle of the flash device head unit 202 in the horizontal direction is 90-degree or more, a rotation angle $\alpha°$ of the flash device head unit 202 in the upper direction is displayed as an angular difference in the upper direction acquired by subtracting the value of the rotation angle $\alpha°$ from 180, i.e., $(180-\alpha)°$ on the display unit 210. With this configuration, when the irradiation optical axis of the light emitting unit 205 is oriented in the same direction as the states illustrated in FIGS. 5B and 5H, the same value is displayed as the angular difference in the upper direction, so that the user can easily recognize the irradiation direction of the external flash device 200. Further, because different values are displayed as the angular differences in the horizontal direction, the user can easily recognize that the flash device head unit 202 is rotated in the horizontal direction.

In the present exemplary embodiment, the information about the vertical direction included in the information indicating the irradiation direction of the external flash device 200 is changed and displayed according to whether the rotation angle of the flash device head unit 202 in the horizontal direction is 90-degree or more. However, the information may be changed according to whether the rotation angle in the horizontal direction exceeds 90-degree.

Further, in the present exemplary embodiment, although a configuration in which the flash device head unit 202 is rotatable by 180-degree in both of the right and the left directions with respect to the flash device main unit 201 has been described, the flash device head unit 202 may be rotatable by 360-degree in both of the right and the left directions with respect to the flash device main unit 201. In this case, the displayed information may be changed according to whether the rotation angle $\beta$ in the horizontal direction falls within the range of "$0°\le\beta<90°$" or "$270°<\beta\le360°$", or the range of "$90°\le\beta\le270°$". As described above, the information displayed as the information indicating the irradiation direction of the external flash device 200 may be changed according to whether the rotation angle in the horizontal direction is included in any one of the first range and the second range which do not overlap with each other. In addition, when the rotation angle of the flash device head unit 202 in the horizontal direction is less than 90-degree, a value of the angular difference of the current irradiation optical axis of the light emitting unit 205 with respect to the irradiation optical axis of the light emitting unit 205 when the flash device head unit 202 is positioned at the reference position and a value of the angular difference between the current position and the reference position of the flash device head unit 202 are the same. However, in order to acquire the angular difference of the current irradiation optical axis of the light emitting unit 205 with respect to the irradiation optical axis of the light emitting unit 205 when the flash device head unit 202 is positioned at the reference position, it is necessary to convert the rotation angles of the flash device head unit 202 in the vertical direction and the horizontal direction detected by the head unit driving control unit 207. Accordingly, when the rotation angle of the flash device head unit 202 in the horizontal direction is less than 90°, it is preferable that the angular difference between the current position and the reference position of the flash device head unit 202 be displayed because a processing load can be reduced.

Figure 6:
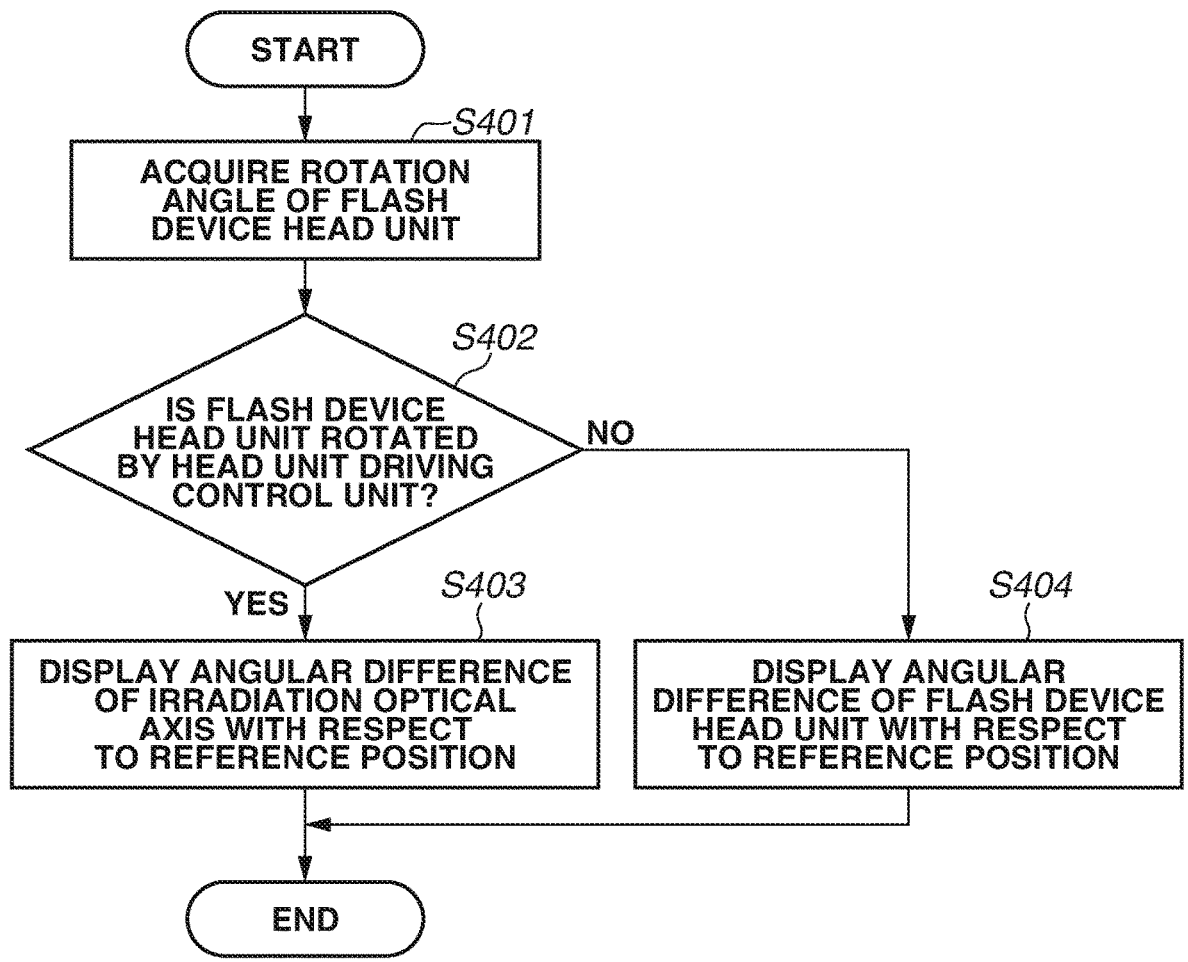
FIG. 6 is a flowchart illustrating display control of information indicating the irradiation direction of the external flash device according to a second exemplary embodiment.

Next, a second exemplary embodiment will be described with reference to FIG. 6. FIG. 6 is a flowchart illustrating display control of the information indicating the irradiation direction of the external flash device 200 in the present exemplary embodiment. In addition, an image capturing system according to the present exemplary embodiment is similar to the image capturing system according to the first exemplary embodiment, and thus descriptions thereof will be omitted.

In the present exemplary embodiment, information displayed as the information indicating the irradiation direction of the external flash device 200 is changed according to whether the flash device head unit 202 is rotated by the head unit driving control unit 207 or by the manual operation of the user. The flowchart in FIG. 6 is started when a specific button or a switch of the operation unit 211 is operated or when the external flash device 200 receives a display request of information indicating the irradiation direction of the external flash device 200 from the camera 100. In addition, the flowchart in FIG. 6 may be started periodically.

In step S401, the flash device MPU 203 acquires rotation angles of the flash device head unit 202 in the vertical direction and the horizontal direction detected by the head unit driving control unit 207. The rotation angles acquired in the above may be the latest information at a time point when the processing proceeds to step S401, or may be the information detected after the processing proceeds to step S401.

In step S402, the flash device MPU 203 determines whether the flash device head unit 202 is rotated by the head unit driving control unit 207. If the flash device head unit 202 is rotated by the head unit driving control unit 207 (YES in step S402), the processing proceeds to step S403. If the flash device head unit 202 is not rotated by the head unit driving control unit 207 (NO in step S402), the processing proceeds to step S404.

In step S403, as the information indicating the irradiation direction of the external flash device 200, the flash device MPU 203 makes the display unit 210 display an angular difference of the current irradiation optical axis of the light emitting unit 205 with respect to the irradiation optical axis of the light emitting unit 205 when the flash device head unit 202 is positioned at the reference position.

On the other hand, in step S404, as the information indicating the irradiation direction of the external flash device 200, the flash device MPU 203 makes the display unit 210 display an angular difference between the current position and the reference position of the flash device head unit 202.

In steps S403 and S404, information is displayed in a same way as in steps S303 and S304 in FIG. 4, so that description thereof will be omitted.

As described above, the present exemplary embodiment, information displayed as the information indicating the irradiation direction of the external flash device 200 is changed according to whether the flash device head unit 202 is rotated by the head unit driving control unit 207. When the flash device head unit 202 is rotated by the head unit driving control unit 207, the same value is displayed as the angular difference in the vertical direction regardless of the value of the angular difference in the horizontal direction, so that the user can easily recognize the irradiation direction of the external flash device 200. On the other hand, if the flash device head unit 202 is not rotated by the head unit driving control unit 207, the angular difference between the current position and the reference position of the flash device head unit 202 is displayed. Accordingly, the user can rotate the flash device head unit 202 while checking to what extent the flash device head unit 202 can be rotated.

In addition, even if the flash device head unit 202 is not rotated by the head unit driving control unit 207, it is desirable that the displayed information be maintained if the head unit driving control unit 207 rotates the flash device head unit 202 to the current position. In other words, in a period when the flash device head unit 202 is not rotated after the flash device head unit 202 is rotated by the head unit driving control unit 207, it is preferable that the angular difference of the current irradiation optical axis of the light emitting unit 205 with respect to the irradiation optical axis of the light emitting unit 205 when the flash device head unit 202 is positioned at the reference position be displayed on the display unit 210.

Figure 7:
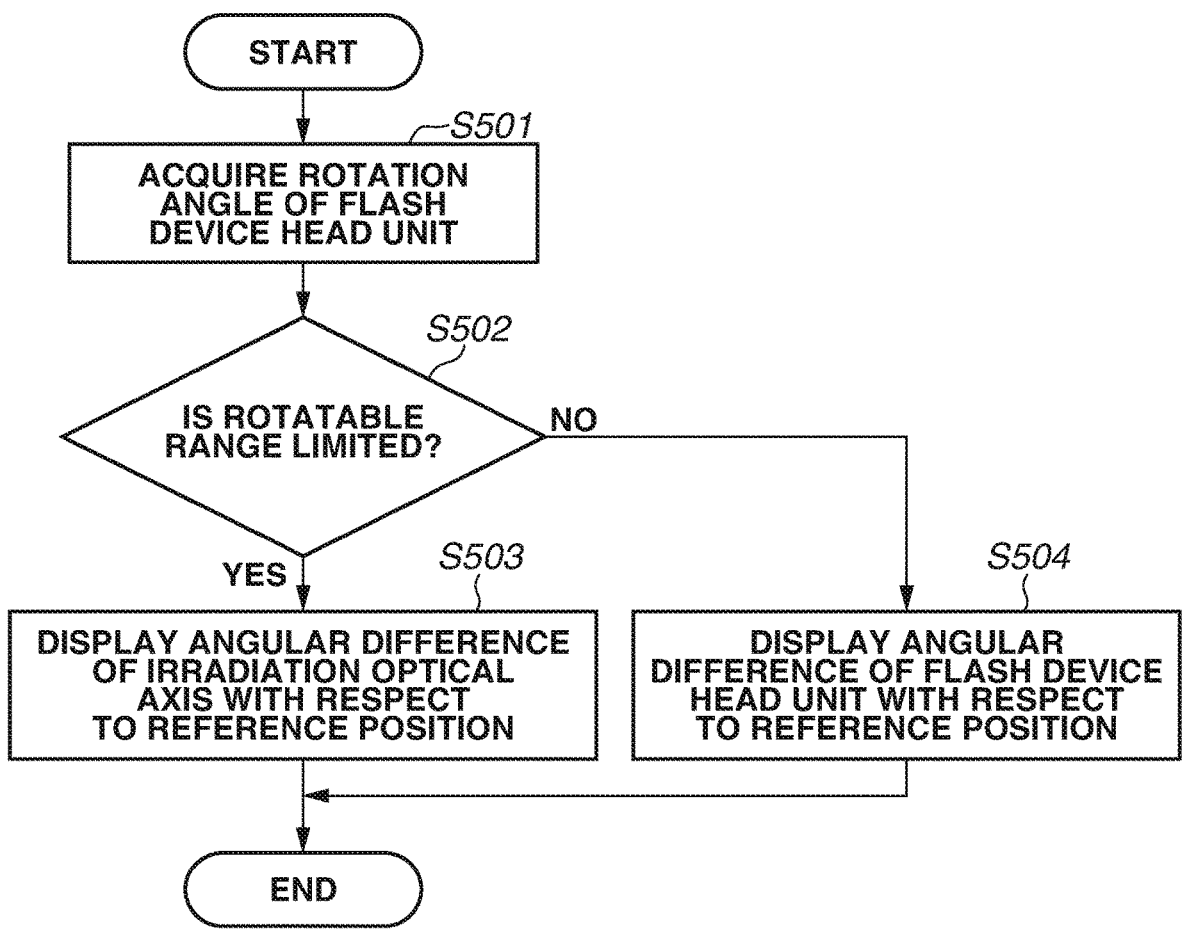
FIG. 7 is a flowchart illustrating display control of information indicating the irradiation direction of the external flash device as one example of bounce angle display, according to a third exemplary embodiment.
Figure 8:
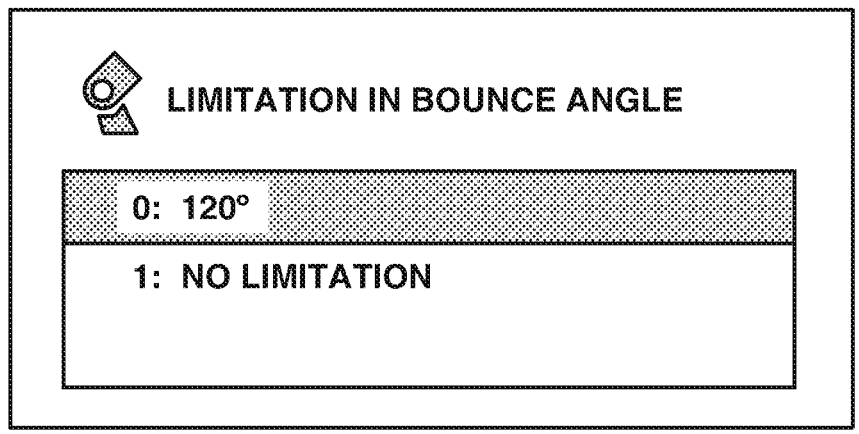
FIG. 8 is a diagram illustrating a menu screen for setting a rotatable range for rotating a flash device head unit according to a third exemplary embodiment.

Next, a third exemplary embodiment will be described with reference to FIGS. 7 and 8. FIG. 7 is a flowchart illustrating display control of the information indicating the irradiation direction of the external flash device 200 in the present exemplary embodiment. FIG. 8 is a diagram illustrating a menu screen for setting a rotatable range for rotating the flash device head unit 202 by the head unit driving control unit 207. In addition, an image capturing system according to the present exemplary embodiment is similar to the image capturing system according to the first exemplary embodiment, and thus description thereof will be omitted.

In the present exemplary embodiment, information displayed as the information indicating the irradiation direction of the external flash device 200 is changed according to whether the rotatable range for rotating the flash device head unit 202 by the head unit driving control unit 207 is limited. The flowchart in FIG. 7 is started when a specific button or a switch of the operation unit 211 is operated or when the external flash device 200 receives a display request of information indicating the irradiation direction of the external flash device 200 from the camera 100. In addition, the flowchart in FIG. 7 may be started periodically.

In step S501, the flash device MPU 203 acquires rotation angles of the flash device head unit 202 in the vertical direction and the horizontal direction detected by the head unit driving control unit 207. The rotation angles acquired in the above may be the latest information at a time point when the processing proceeds to step S501, or may be the information detected after the processing proceeds to step S501.

In step S502, the flash device MPU 203 determines whether the rotatable range for rotating the flash device head unit 202 is limited. The user operates a menu button of the operation unit 211 to display a menu screen (see FIG. 8) on the display unit 210 and sets the rotatable range for rotating the flash device head unit 202 by operating a select button and a confirm button of the operation unit 211. In the present exemplary embodiment, as illustrated in FIG. 8, the user can select whether to limit the rotatable range so as not to make the angular difference of the current irradiation optical axis of the light emitting unit 205 with respect to the irradiation optical axis of the light emitting unit 205 when the flash device head unit 202 is at the reference position exceed 120-degree. By limiting the rotatable range, the irradiation direction of the light emitting unit 205 can be prevented from being excessively oriented toward a back side when the flash device head unit 202 is rotated by the head unit driving control unit 207. For example, as a calculation result of the bounce angle calculation unit 209, it is assumed that the angular differences of the current irradiation optical axis of the light emitting unit 205 with respect to the irradiation optical axis of the light emitting unit 205 when the flash device head unit 202 is positioned at the reference position are acquired as 140-degree and 100-degree in the upper direction and the right direction. In this case, if the rotatable range is limited to 120-degree, the flash device head unit 202 is rotated to a position where the current irradiation optical axis of the light emitting unit 205 has the angular difference of 120-degree in the upper direction with respect to the irradiation optical axis of the light emitting unit 205 when the flash device head unit 202 is positioned at the reference position. As described above, the rotatable range can be limited by the flash device MPU 203 and the head unit driving control unit 207.

If the rotatable range is limited (YES in step S502), the processing proceeds to step S503. If the rotatable range is not limited (NO in step S502), the processing proceeds to step S504.

In step S503, as the information indicating the irradiation direction of the external flash device 200, the flash device MPU 203 makes the display unit 210 display an angular difference of the current irradiation optical axis of the light emitting unit 205 with respect to the irradiation optical axis of the light emitting unit 205 when the flash device head unit 202 is positioned at the reference position.

On the other hand, in step S504, as the information indicating the irradiation direction of the external flash device 200, the flash device MPU 203 makes the display unit 210 display an angular difference between the current position and the reference position of the flash device head unit 202.

In steps S503 and S504, the information is displayed in a same way as in steps S303 and S304 in FIG. 4, so that description thereof will be omitted.

As described above, in the present exemplary embodiment, information displayed the information indicating the irradiation direction of the external flash device 200 is changed according to whether the rotatable range for rotating the flash device head unit 202 by the head unit driving control unit 207 is limited. If the rotatable range is limited, information the same as the information used for limiting the rotatable range is displayed, so that the user can easily recognize the relationship between the rotatable range and the irradiation direction.

Figure 9:
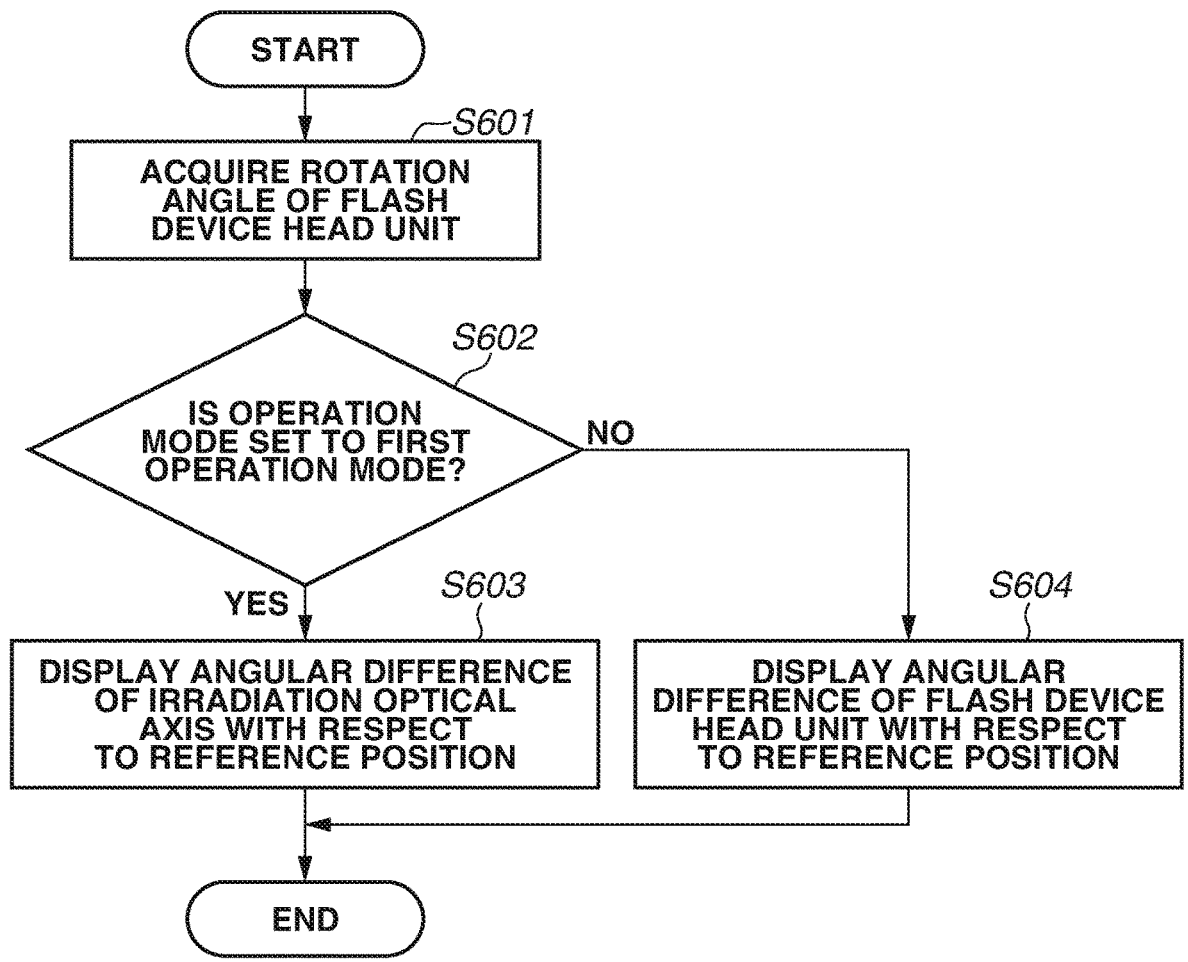
FIG. 9 is a flowchart illustrating display control of information indicating an irradiation direction of the external flash device according to a fourth exemplary embodiment.

Next, a fourth exemplary embodiment will be described with reference to FIG. 9. FIG. 9 is a flowchart illustrating display control of information indicating the irradiation direction of the external flash device 200 in the present exemplary embodiment. In addition, an image capturing system according to the present exemplary embodiment is similar to the image capturing system according to the first exemplary embodiment, and thus description thereof will be omitted.

In the present exemplary embodiment, information displayed as the information indicating the irradiation direction of the external flash device 200 is changed according to whether an operation mode is set to a mode in which the irradiation direction of the external flash device 200 preferable for bounce flash image capturing is calculated by the bounce angle calculation unit 209. The flowchart in FIG. 9 is started when a specific button or a switch of the operation unit 211 is operated or when the external flash device 200 receives a display request of information indicating the irradiation direction of the external flash device 200 from the camera 100. In addition, the flowchart in FIG. 9 may be started periodically.

In step S601, the flash device MPU 203 acquires rotation angles of the flash device head unit 202 in the vertical direction and the horizontal direction detected by the head unit driving control unit 207. The rotation angles acquired in the above may be the latest information at a time point when the processing proceeds to step S601, or may be the information detected after the processing proceeds to step S601.

In step S602, the flash device MPU 203 determines whether the operation mode is set to a mode in which the irradiation direction of the external flash device 200 preferable for bounce flash image capturing is calculated by the bounce angle calculation unit 209 (hereinafter, referred to as "first operation mode"). The operation mode of the external flash device 200 according to the present exemplary embodiment can be set to the above-described first operation mode and a mode in which the irradiation direction of the external flash device 200 preferable for bounce flash image capturing is not calculated by the bounce angle calculation unit 209 (hereinafter, referred to as "second operation mode"). The operation mode is set by the flash device MPU 203 when the user operates a menu button of the operation unit 211 to display a menu screen (not illustrated) on the display unit 210 and operates a select button and a confirm button of the operation unit 211. In the first operation mode, the irradiation direction of the external flash device 200 preferable for bounce flash image capturing is calculated by the bounce angle calculation unit 209, so that the head unit driving control unit 207 rotates the flash device head unit 202 to be oriented in the calculated irradiation direction. Accordingly, when the first operation mode is set thereto, the irradiation direction of the external flash device 200 can be automatically adjusted to the irradiation direction thereof preferable for the bounce flash image capturing, so that the user can easily perform preferable bounce flash image capturing. On the other hand, in the second operation mode, the irradiation direction of the external flash device 200 preferable for the bounce flash image capturing is not calculated by the bounce angle calculation unit 209, so that the user manually adjusts the irradiation direction of the external flash device 200 when bounce flash image capturing is performed. Accordingly, when the second operation mode is set thereto, bounce flash image capturing that reflects the users' intention can be performed.

If the flash device MPU 203 determines that the operation mode is set to the first operation mode in step S602 (YES in step S602), then in step S603, as the information indicating the irradiation direction of the external flash device 200, the flash device MPU 203 makes the display unit 210 display an angular difference of the current irradiation optical axis of the light emitting unit 205 with respect to the irradiation optical axis of the light emitting unit 205 when the flash device head unit 202 is positioned at the reference position.

On the other hand, if the flash device MPU 203 determines that the operation mode is not set to the first operation mode in step S602, i.e., the operation mode is set to the second operation made (NO in step S602), then in step S604, as the information indicating the irradiation direction of the external flash device 200, the flash device MPU 203 makes the display unit 210 display an angular difference between the current position and the reference position of the flash device head unit 202.

In steps S603 and S604, information is displayed in a same way as in steps S303 and S304 in FIG. 4, so that description thereof will be omitted.

As described above, in the present exemplary embodiment, information displayed as the information indicating the irradiation direction of the external flash device 200 is changed according to the operation mode of the external flash device 200. When the operation mode is the first operation mode, priority is given to visibility of the irradiation direction because the irradiation direction of the external flash device 200 is adjusted automatically. More specifically, when the irradiation direction is the same, the same value is displayed as the angular difference in the vertical direction regardless of the value of the rotation angle in the horizontal direction. On the other hand, in the second operation mode, priority is given to operability of the user manually rotating the flash device head unit 202. More specifically, by displaying the angular difference of the flash device head unit 202, a rotation state of the flash device head unit 202 can be recognized easily. As described above, by changing the displayed information according to the operation mode of the external flash device 200, the irradiation direction of the illumination device is precisely notified to the user, so that the user is allowed to easily adjust the irradiation direction of the illumination device.

In addition, in the above-described four exemplary embodiments, although the information indicating the irradiation direction of the external flash device 200 is displayed on the display unit 210 of the external flash device 200, the information may be displayed on the display unit 107 of the camera 100. In this case, the camera MPU 101 acquires the information about the rotation angles of the flash device head unit 202 in the vertical and the horizontal directions and the information used as the determination conditions in the second to the fourth exemplary embodiments from the external flash device 200 and changes the information displayed on the display unit 107. Alternatively, the flash device MPU 203 may determine the information to be displayed and transmit the determined information to the camera MPU 101, so that the camera MPU 101 displays the received information on the display unit 107. Further, the flash device MPU 203 may transmit the determined information to a display apparatus (e.g., a smartphone or a tablet terminal) other than the external flash device 200 or the camera 100 via a known wireless communication module, so that the information is displayed an a display unit of the display apparatus. Furthermore, a CPU of the display apparatus may acquire the information about the rotation angles of the flash device head unit 202 in the vertical and the horizontal directions and the information used as the determination conditions in the second to the fourth exemplary embodiments from the external flash device 200 and display the information on the display unit of the display apparatus.

Further, in the above-described four exemplary embodiments, although the information indicating the irradiation direction of the external flash device 200 has been displayed, information indicating the irradiation direction of the built-in flash device 119 may be displayed if the irradiation direction thereof can be changed in the vertical and the horizontal directions.

Further, in the above-described four exemplary embodiments, although the information about the vertical direction has been changed from among the information indicating the irradiation direction of the external flash device 200, information about the horizontal direction may be changed. For example, a state where the rotation angles of the flash device head unit 202 in the upper direction and the left direction are 60-degree and 90-degree is assumed as a first state, and a state where the rotation angles of the flash device head unit 202 in the upper direction and the right direction are 120-degree and 90-degree is assumed as a second state. In the first state and the second state, although the rotation angles of the flash device head unit 202 are different, the irradiation optical axis of the light emitting unit 205 is oriented in the same direction. Thus, the angular difference of the current irradiation optical axis of the light emitting unit 205 with respect to the irradiation optical axis of the light emitting unit 205 when the flash device head unit 202 is positioned at the reference position is displayed as follows. When the rotation angle in the upper direction is 90-degree or more, with respect to a rotation angle α° of the flash device head unit 202 in the horizontal direction, the angular difference is acquired by subtracting e rotation angle α° from 180-degree (180°−α°), so as to be displayed on the display unit 210 while the orientation thereof is inverted right and left. More specifically, in the second state, an icon indicating the left direction and a value 90° are displayed instead of displaying an icon indicating the right direction and a value 90°.

Further, information about both of the vertical direction and the horizontal direction may be changed according to whether the angular difference of the current irradiation optical axis of the light emitting unit 205 with respect to the irradiation optical axis of the light emitting unit 205 when the flash device head unit 202 is positioned at the reference position is displayed or the angular difference between the current position and the reference position of the flash device head unit 202 is displayed.

For example, in a case where the rotation angles of the flash device head unit 202 in the upper direction and the right direction are 120-degree and the 135-degree, the angular differences between the current position and the reference position of the flash device head unit 202 are displayed as 120-degree in the upper direction and 135-degree in the right direction. On the other hand, in a state same as the above-described state, the angular differences of the current irradiation optical axis of the light emitting unit 205 with respect to the irradiation optical axis of the light emitting unit 205 when the flash device head unit 202 is positioned at the reference position are displayed as 60-degree in the upper direction and 45-degree in the left direction.

Further, in the above-described four exemplary embodiments, although the information indicating the irradiation direction of the external flash device 200 has been displayed on the display unit 210, a sound generation unit such as a speaker may be provided, so that the user is notified of the information indicating the irradiation direction of the external flash device 200 output from the sound generation unit. Furthermore, instead of displaying a numerical value corresponding to the information indicating the irradiation direction of the external flash device 200, an icon corresponding to the information indicating the irradiation direction of the external flash device 200 may be displayed.

Exemplary embodiments according to the present invention have been described as the above. The present invention is not limited to the above-described exemplary embodiments, and many variations and modifications are possible within the scope of the present invention.

For example, the functions of the above-described exemplary embodiments may be embodied as a control method executed by the image capturing apparatus or the illumination device. Further, a program including the functions of the above-described exemplary embodiments may be embodied as a control program executed by a computer included in the image capturing apparatus or the illumination device. In addition, for example, the control program is stored in a computer-readable storage medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-140646, filed Jul. 15, 2016, which is hereby incorporated by reference herein in its entirety.

What is claimed is:

1. An illumination device comprising:
a first housing;
a second housing having a light source, capable of rotating with respect to the first housing;
a driving unit configured to rotate the second housing about a first axis in a first direction and/or a second axis orthogonal to the first axis in a second direction, with respect to the first housing; and
a display control unit configured to display, on a display unit, information indicating an irradiation direction of light from the light source,
wherein the display control unit changes information about the first direction included in the information indicating the irradiation direction displayed on the display unit, according to a rotation angle of the second housing in the second direction even if a rotation angle of the second housing in the first direction is not changed.

2. The illumination device according to claim 1, wherein the display control unit changes the information about the first direction based on whether the rotation angle of the second housing in the second direction is included in a first range.

3. The illumination device according to claim 2, further comprising a determination unit configured to determine whether a value of the rotation angle of the second housing in the second direction is a predetermined threshold value or more,
wherein the display control unit changes the information about the first direction based on a determination result of the determination unit.

4. The illumination device according to claim 1, wherein the first direction is a direction in which the first housing is aligned with the second housing.

5. The illumination device according to claim 1, further comprising a transmission unit configured to transmit the information indicating the irradiation direction displayed on the display unit to a display apparatus having the display unit.

6. The illumination device according to claim 1, further comprising a detection unit configured to detect a rotation angle of the second housing in the first direction with respect to the first housing,
wherein the display control unit changes the information about the first direction displayed on the display unit between information indicating the rotation angle detected by the detection unit and information indicating an angle acquired by subtracting the rotation angle detected by the detection unit from 180-degree.

7. An illumination device comprising:
a first housing;
a second housing having a light source, capable of rotating with respect to the first housing;
a driving unit configured to rotate the second housing about a first axis in a first direction and/or a second axis orthogonal to the first axis in a second direction, with respect to the first housing; and
a display control unit configured to display, on a display unit, information indicating an irradiation direction of light from the light source,
wherein the display control unit changes the information indicating the irradiation direction displayed on the display unit between information indicating an angular difference of a current irradiation optical axis of the light source with respect to an irradiation optical axis of the light source when the second housing is positioned at a reference position and information indicating an angular difference between a current position of the second housing and the reference position of the second housing.

8. A display apparatus communicable with an illumination device including a first housing, a second housing having a light source and capable of rotating with respect to the first housing, and a driving unit configured to rotate the second housing about a first axis in a first direction and/or a second axis orthogonal to the first axis in a second direction with respect to the first housing, the display apparatus comprising:
a display control unit configured to display, on a display unit, information indicating an irradiation direction of light from the light source,
wherein the display control unit changes information about the first direction included in the information indicating the irradiation direction displayed on the display unit, according to a rotation angle of the second housing in the second direction even if a rotation angle of the second housing in the first direction is not changed.

9. A display apparatus communicable with an illumination device including a first housing, a second housing having a light source and capable of rotating with respect to the first housing, and a driving unit configured to rotate the second housing about a first axis in a first direction and/or a second axis orthogonal to the first axis in a second direction with respect to the first housing, the display apparatus comprising:
a display control unit configured to display, on a display unit, information indicating an irradiation direction of light from the light source,
wherein the display control unit changes the information indicating the irradiation direction displayed on the display unit between information indicating an angular difference of a current irradiation optical axis of the light source with respect to an irradiation optical axis of the light source when the second housing is positioned at a reference position and information indicating an angular difference between a current position of the second housing and the reference position of the second housing.

10. A display control method for displaying, on a display unit, display information indicating an irradiation direction of light from a light source of an illumination device that includes a first housing, a second housing having the light source and capable of rotating with respect to the first housing, and a driving unit configured to rotate the second housing about a first axis in a first direction and/or a second axis orthogonal to the first axis in a second direction with respect to the first housing, the display control method comprising:

changing information about the first direction included in the information indicating the irradiation direction displayed on the display unit, according to a rotation angle of the second housing in the second direction even if a rotation angle of the second housing in the first direction is not changed.

11. A display control method for displaying, on a display unit, display information indicating an irradiation direction of light from a light source of an illumination device that includes a first housing, a second housing having the light source and capable of rotating with respect to the first housing, and a driving unit configured to rotate the second housing about a first axis in a first direction and/or a second axis orthogonal to the first axis in a second direction with respect to the first housing, the display control method comprising:

changing the information indicating the irradiation direction displayed on the display unit between information indicating an angular difference of a current irradiation optical axis of the light source with respect to an irradiation optical axis of the light source when the second housing is positioned at a reference position and information indicating an angular difference between a current position of the second housing and the reference position of the second housing.

* * * * *